UNITED STATES PATENT OFFICE.

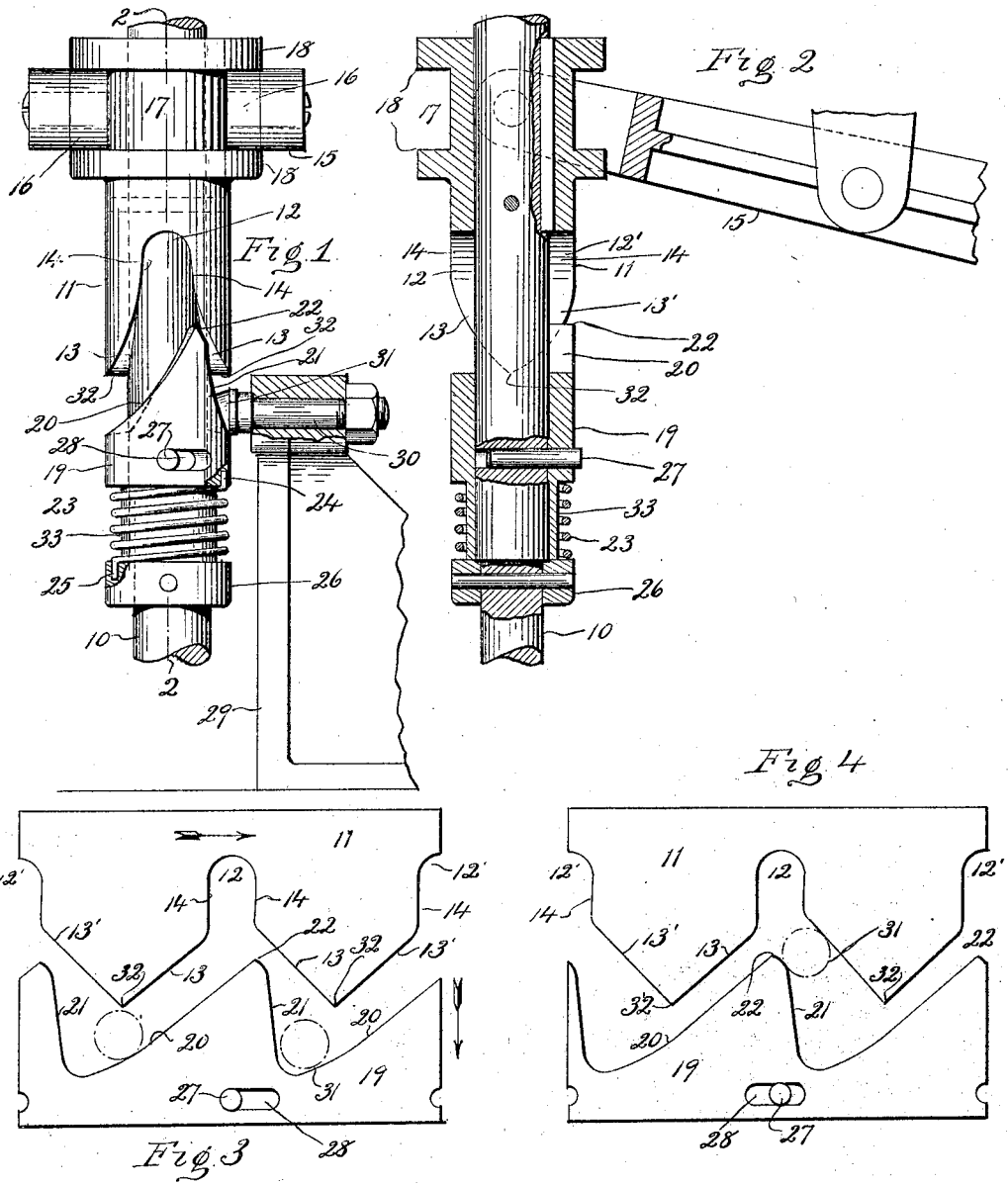

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

MECHANICAL MOVEMENT.

1,387,101. Specification of Letters Patent. Patented Aug. 9, 1921.

Application filed March 8, 1920. Serial No. 364,292.

*To all whom it may concern:*

Be it known that I, ZENAS P. CANDEE, a citizen of the United States, residing at Waterbury, in the county of New Haven and State of Connecticut, have invented certain new and useful Improvements in Mechanical Movements, of which the following is a specification, reference being had therein to the accompanying drawings.

This invention relates to a new and improved mechanical movement having for its object, among other things to provide an intermittent rotary movement to a part, during the reciprocation thereof.

To these, and other ends, my invention consists in the mechanical movement, having certain details of construction and combinations of parts, as will be hereinafter described and more particularly pointed out in the claims.

Referring to the drawings, in which like numerals of reference designate like parts in the several figures;

Figure 1 is an elevation of my improved mechanism;

Fig. 2 is a sectional view thereof, taken substantially upon line 2—2 of Fig. 1;

Fig. 3 is a diagrammatic view of the cams developed to show their relative positions during one period of their operation; and Fig. 4 is a similar view to illustrate the relative position of the cams in another of their positions.

In the drawings, the numeral 10 designates a shaft, to which is fixed a cam 11, having oppositely disposed recesses 12 and 12′, having substantially parallel sides 14, which are connected by the cam surfaces 13 and 13′, which meet at the point 32.

The cam 11 and the shaft with which it is connected derive endwise movement from a rock lever 15, having shoes 16 at its outer end, which enter the recess 17 formed between the collars 18 upon the cam 11.

Movably mounted upon said shaft 10 is a second cam 19, having cam faces 20 and 21 thereon which join each other at 22, these latter points projecting into the open space between the faces 13—13 and 13′—13′ upon the cam 11.

Surrounding the shank 33 of the cam 19 is a coil spring 23 the end 24 of which is fixed in said cam and the opposite end 25 in a collar 26 fixed to the shaft 10, the tension of this spring being such as to give a slight rotary movement to the cam 19 upon the shaft 10, which is permitted and limited by the pin 27 fixed in said shaft and projecting into the peripheral slot 28 in said cam. Mounted in a fixed part 29 is a stud 30, upon the outer end of which is mounted a roll 31 which projects into the open space between the cams 11 and 19.

The diagrammatic view shown in Fig. 3 is a development of the cams in the relative positions illustrated in Fig. 1, at which time it will be noted that the junction point 22 of the cam 19 is adjacent to one of the faces 13 and 13′ of the cam 11 and the roll 31 is in substantially the position shown by broken lines therein. The shaft 10 is now given an endwise movement in the direction of the vertical arrow in Fig. 3, at which time the roll 31 moves through the space between the cam face 21 and face 13 until it contacts with said latter face at the right of the center of Fig. 3, when it moves the cam 19 and the shaft 10, to which it is secured, about its axis, and the pin 27 moves in the slot 28, its then approximate position being shown in Fig. 4, at which time the roll 31 passes beyond the point 22 and the cam 19 being now released from pressure the spring 23 returns it to its original position and the roll 31 continues its contact with the cam face 13 and enters the recess 12, passing one of the walls 14 until the axis of said roll registers with that of the curved upper end of said recess 12. The relative positions of the cams 11 and 19 when the roll 31 is passing the point 22 is substantially shown in the diagrammatic Fig. 4. These movements move the shaft 10 about its axis about 90°.

It will be noted from Fig. 3 that with the point 22 of the cam 19 in the relative position with the cam face 13, as shown therein, there is not sufficient room for the roll 31 to pass therebetween and that this point is in substantially the same line as the right wall 14 of the recesses 12. As the cams 11 and 19 are now moved in the reverse position from that above described, the roll 31 follows in between the walls 14 until it contacts with the cam face 20 of the cam 19 adjacent to the point 22 and thereafter travels in the substantially parallel space between said cam face 20 and the cam face 13 upon the left of the center of the Fig. 3, until it arrives at a point a little beyond the point 32. This action imparts a movement to the shaft 10 about its axis, through an arc of about 90°. This latter movement combined with the arc first described moves the said shaft through an arc of about 180°. The reverse endwise movement is now imparted to the shaft 10 and the operations repeated as before.

By reason of the rotation of the cam 19 upon the shaft 10 the shaft 10 always rotates in the same direction, as the open space between the cam surfaces 13—13′, and 20 and 21 varies in width the cam roll 31 being permitted to pass the points 22 of the cam 19 in but one direction.

Having described my invention what I claim as new and desire to secure by Letters Patent, is:

1. In combination with a shaft, of means for imparting a reciprocatory movement thereto; means for intermittently rotating said shaft during its reciprocation, comprising in part, mechanism providing an irregular path that extends around said shaft and in part parallel therewith; and a member disassociated from said shaft projecting into said path.

2. The combination with a reciprocating shaft; of means for rotating the same during its reciprocation, said means comprising a cam fixed on said shaft; a cam movable on said shaft, and a member coöperating therewith attached to a fixed part.

3. The combination with a shaft; of means for imparting a reciprocatory movement thereto; cam means for rotating said shaft, said means comprising a cam fixed to said shaft, a second cam movably mounted thereon, and an independent member in the path of movement of both of said cams.

4. The combination with a reciprocating shaft; of means for imparting a rotary movement thereto during its reciprocation, said means comprising a cam fixed to said shaft, and a second cam movably mounted thereon, said cams being so arranged that parts of one cam project into the open space between portions of the other cam.

5. The combination with a reciprocating shaft; of means for imparting a rotary movement thereto during its reciprocation, said means comprising a cam fixed to said shaft, and a second cam having a limited rotary movement on said shaft and a member within the space between said cams.

6. The combination with a shaft; of means for imparting a reciprocatory movement thereto; and cam means connected with said shaft for rotating said shaft during its reciprocation, said cams being so arranged as to have an open space therebetween that at one or more places is variable in width during a single rotation of said shaft.

7. The combination with a shaft; of means for imparting a reciprocatory movement thereto; and cam means connected with said shaft for rotating said shaft during its reciprocation, said cams being so arranged as to have an open space therebetween that at one or more places is substantially closed during a single rotation of said shaft.

8. The combination with a reciprocating shaft; of means for rotating the same during its reciprocation, said means comprising a cam fixed on said shaft; a cam movable on said shaft, and a member coöperating therewith attached to a fixed part, said member by its engagement with said cams imparting movement to said movable cam.

9. The combination with a reciprocating shaft; of means for rotating the same during its reciprocation, said means comprising a cam fixed on said shaft; a cam movable on said shaft, and a member coöperating therewith attached to a fixed part, said cams being so arranged as to have an open space therebetween, the width of which is in part determined by said member.

10. The combination with a reciprocating shaft; of means for rotating the same during its reciprocation, said means comprising a cam fixed on said shaft, a cam movable on said shaft; and a member coöperating therewith attached to a fixed part; and yielding means for actuating said movable cam in the opposite direction.

11. The combination with a reciprocating shaft; of means for rotating the same during its reciprocation, said means comprising a cam fixed on said shaft, and a cam movable on said shaft; and means for limiting the movement of said latter cam in both directions.

12. The combination with a reciprocating shaft; of means for rotating the same, means for holding the same against rotation, said means comprising companion cams upon said shaft with a path therebetween; a member mounted on a fixed part projecting into said path; and means for securing one of said cams to said shaft whereby it will yield at one or more places during its rotation when engaged by said member and permit the same to pass through said path and return to its former position after such yielding action.

13. The combination with a reciprocating shaft; of means for rotating the same, means for holding the same against rotation at a predetermined point in its rotary path, said means comprising companion cams upon said shaft with a path therebetween; a member mounted on a fixed part projecting into said path; and means for securing one of said cams to said shaft whereby it will yield at one or more places during its rotation when engaged by said member and permit the same 14. The combination with a reciprocating shaft; of means for rotating the same, means for holding the same against rotation, said means comprising companion cams upon said shaft with a path therebetween; a member mounted on a fixed part projecting into said path; and means for securing one of said cams to said shaft whereby it will yield at one or more places during its rotation when engaged by said member and permit the same to pass through said path while traveling in one direction.

15. The combination with a reciprocating shaft; of means for rotating the same, means for holding the same against rotation, said means comprising companion cams upon said shaft with a path therebetween; a member mounted on a fixed part projecting into said path; and means for securing one of said cams to said shaft whereby it will yield at one or more places during its rotation when engaged by said member and permit the same to pass through said path, return to its former position after such yielding action and prevent said member from traveling in a return direction through said path.

16. The combination with a reciprocating shaft; of means for rotating the same, means for holding the same against rotation, said means comprising companion cams upon said shaft with a path therebetween; a member mounted on a fixed part projecting into said path; and means for securing one of said cams to said shaft whereby it will yield at one or more places during its rotation when engaged by said member and permit the same to pass through said path, return to its former position after such yielding action, and prevent said member from traveling in a return direction through said path, whereby the rotary movement of said shaft is always in the same direction.

17. The combination with a reciprocating shaft; of means for rotating the same, means for holding the same against rotation at a predetermined point in its rotary path, said means comprising companion cams upon said shaft with a path therebetween; a member mounted on a fixed part projecting into said path; and means for securing one of said cams to said shaft whereby it will yield at one or more places, when engaged by said member and permit the same to pass through said path and return to its former position after such yielding action, this cam action closing one portion of said path while opening another portion.

18. The combination with a reciprocating shaft; of means for imparting a rotary movement thereto during its reciprocation, said means comprising a cam fixed to said shaft, and a second cam having a limited rotary movement on said shaft; a member projecting into the space between said cams; and a spring engaging said last mentioned cam to normally hold it in one of its positions.

19. The combination with a reciprocating shaft; of means for imparting a rotary movement thereto during its reciprocation; said means comprising a cam fixed to said shaft, a second cam movably mounted thereon; a member projecting into the space between said cam; an element fixed to said shaft; and a spring having engagement with said element and said second cam whereby said second cam moves in one direction against the tension of said spring.

20. In combination with a shaft, of means for imparting a reciprocatory movement thereto; and means for intermittently rotating said shaft during its reciprocation, comprising in part, mechanism providing an irregular path, that extends around said shaft and in part parallel therewith, and a member projecting into said path, the arrangement of said mechanism being such that when said member is in a portion of said path, said shaft will be held against rotation during a portion of its reciprocation.

21. The combination with a shaft; of means for imparting a reciprocatory movement thereto; cam means for rotating said shaft, said means comprising a cam fixed to said shaft, a second cam movably mounted thereon, and an independent member in the path of movement of both of said cams, one of said cams being so shaped that when engaged by said independent member, in one of its relative positions, said shaft will be held against rotation.

22. The combination with a shaft; of means for imparting a reciprocatory movement thereto; cam means for rotating said shaft, said means comprising a cam fixed to said shaft, a second cam movably mounted thereon, and an independent member in the path of movement of both of said cams, one of said cams and said independent member also coöperating to hold said shaft against rotation when in one of their relative positions.

23. In combination with a shaft, of means for imparting a reciprocatory movement thereto; and means for intermittently rotating said shaft during its reciprocation, comprising in part, mechanism providing an irregular path, that extends around said shaft and in part parallel therewith, and a member projecting into said path, said mechanism being so arranged that by their relative movements, the width of said path is caused to vary.

24. In combination with a shaft, of means for imparting a reciprocatory movement thereto; and means for intermittently rotating said shaft during its reciprocation, comprising in part, mechanism providing an irregular path, that extends around said shaft and in part parallel therewith, and a member projecting into said path, said mechanism being so arranged that the width of said path is determined by the relative position of said member therein.

25. In combination with a shaft, of means for imparting a reciprocatory movement thereto; and means for intermittently rotating said shaft during its reciprocation, comprising in part, mechanism providing an irregular path, that extends around said shaft and in part parallel therewith, and a member projecting into said path, said mechanism being so arranged that the width of a portion of said path is constant and the remainder thereof is variable depending upon the relative position of said member.

In testimony whereof, I have hereunto affixed my signature.

ZENAS P. CANDEE.